United States Patent [19]
Hijiya et al.

[11] 3,873,333
[45] Mar. 25, 1975

[54] ADHESIVES AND PASTES

[75] Inventors: Hiromi Hijiya; Makoto Shiosaka, both of Okayama, Japan

[73] Assignee: Hayashibara Biochemical Laboratories, Incorporated, Okayama-ken, Japan

[22] Filed: Jan. 17, 1974

[21] Appl. No.: 434,298

[52] U.S. Cl. ............... 106/130, 106/204, 106/213, 117/122 PA, 117/156, 260/9
[51] Int. Cl. .......................... C08h 1/00, C08h 7/00
[58] Field of Search .................. 106/130, 213, 204; 117/122 PA, 156; 260/9

[56] References Cited
UNITED STATES PATENTS
3,784,390  1/1974  Hijiya et al. ..................... 106/213

*Primary Examiner*—Theodore Morris
*Attorney, Agent, or Firm*—Hans Berman; Kurt Kelman

[57] ABSTRACT

Adhesives or pastes prepared by dissolving or dispersing uniformly a pullulan ester and/or pullulan ether in water or in a mixture of water and acetone in an amount between 5 percent and 40 percent of the solvent are moisture-proof and have better water retention, stability and adhesiveness than conventional starch pastes or glue. They are also non-toxic and resistant to the growth of fungi.

9 Claims, No Drawings

ADHESIVES AND PASTES

The present invention relates to adhesives. Adhesives for stationary, re-moistening pastes for labels, stamps and tapes based on modified starch, gum arabic, animal glue, and polyvinylalcohol have been used widely. However, conventional stationary adhesives and pastes retain their adhesiveness after application for relatively short periods only. Also conventional re-moistening adhesives and pastes develop adhesiveness slowly after moistening, and the period of adhesiveness is short. In addition, the conventional re-moistening adhesives and pastes support growth of fungi when stored at high humidity, and cracks form on the surface of the known adhesives upon drying and cause delamination.

The above disadvantages can be avoided to a great extent by employing pullulan. However, adhesives and pastes containing pullulan as the main component still have somewhat higher water solubility and lower moisture resistance than is desired. It is a primary object of the present invention to eliminate the disadvantages of pullulan adhesives and pastes. The water solubility, water absorption, moisture retention and moisture premeability of pullulan can be improved by converting pullulan into pullulan derivatives, whereby the disadvantages of pullulan adhesives and pastes are eliminated. Throughout this specification, the term "degree of substitution," abbreviated hereinafter as D.S., refers to the number of acyl groups per gluclose residue of pullulan, the highest possible D.S. being 3.0.

Pullulan is a viscous polysaccharide found in culture media of *Pullularia pullulans* IFO 6353 or *Dematium pullulans* IFO 4464. Unlike other glucans such as starch, dextran, and cellulose, pullulan is a polymer of maltotriose linked linearly by alpha-1,6-linkages.

The adhesives and pastes of this invention contain a pullulan derivative selected from the group consisting of fatty acid esters, aromatic carboxylic acid esters, alkyl ethers, hydroxyalkyl ethers, and carboxyalkyl ethers of pullulan, and have improved water solubility, absorption of water, moisture retention, and moisture permeability as compared with those prepared with pullulan.

The products prepared in accordance with the present invention have the following properties:

1. The water solubility of the pullulan derivatives can be freely adjusted by varying the substituent and/or D.S. The adhesives and pastes prepared with the derivatives obtained by such adjustment suffer minimal dissolving loss as re-moistening adhesives and pastes used on labels, stamps, and tapes, whereby their consumption is reduced.

2. Although pullulan derivatives are somewhat difficult to dissolve in water, they absorb moisture, gelatinize rapidly on moistening, and retain their adhesiveness for an extended period since the gelatinized layer is stable.

3. Since the gels formed upon gelatinization of the derivatives are stable and do not suffer separation of water, they are advantageous in adhesives and pastes for stationary use. The adhesives and pastes prepared with the derivatives are useful for paper, cloth, textiles and wooden materials, glass, metal and plastics.

4. The surface of the adhesives and pastes prepared with the derivatives does not absorb moisture nor swell at high relative humidity in the ambient atmosphere, nor do the adhesives lose their adhesiveness, form cracks, or cause delamination when kept in dry surroundings.

5. Gum-like adhesives and pastes which do not suffer excessive drying can be prepared from derivatives of relatively high D.S. value in combination with a plasticizer.

6. The pullulan derivatives are non-toxic and resistant against the growth of fungi.

Pullulan, the starting material for preparing adhesives and pastes of the present invention, is obtained by submerged culture of *Pullularia pullulans* IFO 6353 or *Dematium pullulans* IFO 4464 in a medium containing sucrose, glucose, date extract, invert sugar, or starch hydrolyzate as a carbon source. The molecular weight of pullulan is freely adjustable between 10,000 to 5,000,000 by varying the fermentation conditions. Generally, a pullulan with a molecular weight of 10,000 to 500,000 is used in the present invention. The pullulan recovered from the culture broth as a white powder by precipitation with an organic solvent has extremely high water solubility.

The pullulan derivatives used in accordance with the present invention are novel compounds. Pullulan esters are produced by reacting pullulan with an excess of organic acid anhydrides or organic acid chlorides in a solvent in the presence of a catalyst. Solvents which act as catalysts include organic tertiary bases such as pyridine, quinoline, picoline, dimethylformamide, etc. Dimethyl sulfoxide, benzene and toluene are also useful solvents, and alkali metal hydroxides or acetates may be used as catalysts. The reaction product can be purified by precipitation and washing with an organic solvent. Mixed pullulan esters are prepared with ease by allowing pullulan formic acid ester to react with another organic acid or by ester interchange between pullulan and an ester.

The methyl or ethyl ethers of pullulan are prepared by reacting pullulan in alkaline 2.5 to 10 percent solution not over 100°C with continuous stirring with dimethyl or diethyl sulfates which is added gradually to the solution as an alkylating agent. Products with D.S. of 0.5 or less are obtained.

When alkyl halides, such as ethyl, propyl and butyl halides are employed as alkylating agents, benzene and toluene can be employed as solvents, and solid alkali hydroxides as catalysts. Pullulan ethers are also prepared by reacting pullulan formic acid ester with an alkylating agent, such as dimethyl or diethyl sulfate. It is preferred to prevent depolymerization of the pullulan by carrying out the reaction at the lowest possible temperature, and by minimizing contact with air. If the desired product precipitates from the reaction medium, it is recovered by filtering. If the product is dissolved in the medium, an organic solvent is added, whereby a precipitate is formed which is recovered and purified.

Other pullulan ethers, such as the hydroxypropyl, hydroxyethyl or carboxymethyl ether of pullulan can be produced similarly.

Pullulan carboxymethyl ether is prepared readily by reactiong pullulan in alkaline solution with monochloroacetic acid, and collecting the precipitate formed upon the addition of alcohol, or by suspending pullulan in aqueous alcohol, reacting the suspended pullulan with monochloroacetic acid, and collecting the product. Pullulan hydroxyalkyl ether is prepared by dissolving pullulan in an aqueous caustic alkali solution in a concentration of more than 2 percent at a temperature not higher than 100°C, and adding an alkylene oxide, such as propylene oxide or ethylene, oxide, to the solution. The reaction proceeds with stirring, the precipitate formed upon addition of an organic solvent, such as methanol or ethanol, is collected and purified with 50 percent (by volume) alcohol.

Pullulan esters with fatty acids having up to four carbon atoms having a D.S. of not higher than about 0.7 are soluble in cold water. Esters with a D.S. in the range of 1 to 2 are soluble in water-acetone mixtures. In preparing water-proof adhesives and pastes, lower fatty acid esters of pullulan, such as the acetic, propionic and butyric acid esters, having a D.S. higher than 0.7, are preferably used.

Pullulan ethers, such as the alkyl ethers, have slightly lower water solubility than the corresponding pullulan esters. The water resistance of pullulan alkyl ethers varies with their alkyl group and D.S. Generally, a higher D.S. enhances water resistance and causes formation of a more stable gel. The alkyl ethers absorb moisture and rapidly form a gel satisfactory adhesiveness.

The carboxymethyl and hydroxyalkyl ethers have higher water solubility compared with pullulan esters and other ethers, but improve the viscosity and the adhesiveness of adhesives or pastes of this invention.

For preparing water soluble adhesives, the lower fatty acid esters of pullulan, such as those of acetic and propionic acid, having a D.S. not higher than about 0.7, the pullulan lower alkyl ethers, such as the methyl, ethyl, and propyl ethers, having a D.S. not higher than about 0.5, and carboxymethyl and hydroxyalkyl ethers are preferred.

The esters or ethers of pullulan are used as adhesives in aqueous 5 to 4 percent solutions.

Pastes of uniform consistency which do not liquefy spontaneously at room temperature are prepared by dissolving the ester or ether in a solvent with stirring at elevated temperature. When heated, the paste can be applied uniformly on the back of labels or stamps while in a fluid state, and thereafter dried with warm air at 50°– 80°C. When moistened with a damp cloth, the dry paste absorbs moisture immediately and forms a paste layer which becomes strongly adhesive within an extremely short time.

When good water resistance is needed, pullulan lower fatty acid esters having a D.S. of about 1 to 1.5 are suitable. Although pastes prepared with such esters are difficult to dissolve completely in water, they dissolve uniformly in a mixture of water and acetone. Dispersions or solutions of such esters in water or a mixture of water and organic solvent form pastes having high adhesiveness when applied to a substance and dried. The adhesiveness is not impaired by absorption of moisture or moistening.

Pastes containing as a plasticizer a polyhydric alcohol such as ethyleneglycol, glycerine, propyleneglycol, trimethylolpropane, sorbitol, or maltitol exhibit satisfactory adhesiveness even at low moisture content, and they are suitable for seals stickers, adhesive tapes of paper and cloth etc. The polyhydric alcohol should be added to the pullulan derivatives in an amount smaller than the weight of the pullulan ester and/or ether.

In addition to pullulan esters and/or pullulan ethers, the adhesives and pastes may contain, as hydrophilic substances, pullulan, amylose, starch, modified starch, gelatin or polyvinyl alcohol in an amount smaller than one third of the weight of pullulan ester and/or ether.

The pullulan derivatives of the invention are also useful sizing agents for paper, fibers, and textiles which can be removed by washing with water and eventual degradation and dispersion. They are also useful for specific medical applications. Other applications of the adhesives and pastes of the present invention will readily suggest themselves to those skilled in the art on the basis of the above teachings. The present invention will be illustrated further by the following examples in which all percentages are by weight unless stated otherwise.

EXAMPLE 1 a. Pullulan acetic esters were prepared by dissolving 50 g pullulan, molecular weight 450,000, in a mixture of 500 g dimethylformamide and 100 g pyridine at 60°C, adding thereto dropwise either 0.35 or 1.0 mole of acetic anhydride per one glucose residue of pullulan over one hour with stirring, and holding the mixture for one hour and a half at 60°C. After the reaction, ethanol was added, and the precipitate formed was recovered and purified by washing with ethanol. The pullulan acetic esters were obtained in a yield of about 95 percent, their D.S. values were 0.31 and 0.95, respectively, and they were a white, water-soluble powder.

b. Pullulan propionic acid esters were prepared as in Example 1a), except that either 0.2 or 0.7 mole propionic anhydride was added instead of acetic anhydride. The yield was about 90 percent, and the D.S. values were 0.18 and 0.6, respectively.

c. Pullulan ethyl ethers having D.S. values of 0.07 and 0.1 respectively were prepared by dissolving pullulan of molecular weight 300,000 in 300 ml of 10 percent aqueous sodium hydroxide solution, adding diethyl sulfate dropwise in 20 percent excess, holding the mixtures at 60°C for 2 hours with stirring, neutralizing the mixture, precipitating the ethers with methanol, filtering them, washing them with methanol, and drying them.

d. Pullulan carboxymethyl ether was prepared by dissolving 50 g pullulan of molecular weight 50,000 in 250 ml of a 5 percent aqueous sodium hydroxide solution, adding dropwise 0.1 mole monochloroacetic acid per glucose residue of the pullulan, holding the mixture at 40°C with stirring, neutralizing the mixture, recovering the carboxymethyl ether after precipitation by ethanol, washing the precipitate with ethanol and drying. Thus, 47 g carboxymethyl ether having a D.S. of 0.07 was obtained and was readily water-soluble.

e. Pullulan hydroxypropyl ether was prepared by dissolving 50 g pullulan of molecular weight 300,000 in 300 ml of a 2.5 percent aqueous sodium hydroxide solution, adding dropwise one mole propylene oxide per glucose residue of the pullulan with stirring at 40°C for 3 hours, neutralizing the reaction solution with acetic acid, precipitating the ether with ethanol, filtering the precipitate, and washing it with ethanol. Thus, 40 g pullulan hydroxypropyl ether powder of high water solubility and having a D.S. value of 0.08 was obtained.

f. Adhesiveness Test:

The pullulan acetic acid ester of D.S. 0.31 obtained in Example 1a was made into a 15 percent paste with warm water. A control was prepared by dissolving a commercial dextrin product in water with heating in a concentration of 15 percent. Respective end portions (30 mm × 3 mm) of fine Kraft paper strips (30mm × 60 mm) were coated with the pastes in an amount of 30 g of paste per m², the paper strips were allowed to stand for 5, 30, 120, or 240 seconds, whereupon the strip ends carrying the paste were pressed against the bare ends of the same paper strips, and the bonded strips were allowed to stand for additional 10, 20, or 40 seconds before the bonds were tested on a tensile strength tester. The test results are listed in Table I in kg/mm².

TABLE 1

| Interval between coating and bonding | After 10 seconds P. ester | After 10 seconds Dextrin | Bond strength, kg/mm² After 20 seconds P. ester | After 20 seconds Dextrin | After 40 seconds P. ester | After 40 seconds Dextrin |
| --- | --- | --- | --- | --- | --- | --- |
| 5 sec. | 12.5 | 10.5 | 21.1 | 10.5 | 29.1 | 19.1 |
| 30 sec. | 16.1 | 10.9 | 23.5 | 10.1 | 30.5 | 20.5 |
| 120 sec. | 13.9 | 3.1 | 15.5 | 4.2 | 21.1 | 7.1 |
| 240 sec. | 7.5 | 0.5 | 8.1 | 0 | 15.1 | 0.2 |

As is apparent from Table I, even when the interval between coating and bonding is longer for the pullulan ester paste than for the dextrin paste, the former exhibits higher adhesiveness, which is probably due to better moisture retention. In addition, the pullulan acetic acid ester paste has higher adhesivensss after bonding, and the increase in bond strength after bonding is much greater than for the control.

EXAMPLE 2

Comparison tests were carried out between a pullulan propionic acid ester paste, D.S. 0.18, and the dextrin control paste. The results were almost equal to those of the pullulan acetic acid ester paste of the preceding example.

EXAMPLE 3

Pullulan ethyl ether, D.S. 0.07, was dissolved completely in warm water to form a 10 percent paste. The paste was tested as in Example 1f against the same dextrin paste as a control. The pullulan ether paste retained adhesiveness for approximately the same period after coating as the pullulan acetic acid ester paste of Example 1. In addition, the adhesiveness increased rapidly after bonding as with the pullulan acetic acid ester paste, and the increase was much greater than that of the control.

EXAMPLE 4

Pastes were prepared by adding to the pullulan acetic acid ester paste, as prepared in Example 1a, either pullulan hydroxypropyl ether or pullulan carboxymethyl ether prepared as described in Example 1e and 1d, in an amount of 10 percent based on the weight of pullulan acetic acid ester. Although no great difference was noted in adhesiveness in comparison with the pullulan acetic acid paste, the mixture showed a slight increase in viscosity and more favorable spread-out.

EXAMPLE 5

A 10 percent paste was prepared by dissolving a mixture of equivalent amounts of pullulan acetic acid ester and pullulan propionic acid ester in warm water. The paste, when cooled to room temperature, was softer and had more desirable spread-out characteristics than the paste prepared from pullulan acetic acid ester only. However, no difference in adhesiveness between the two pastes were observed.

EXAMPLE 6

Aqueous acetone (1:1) and pullulan acetic acid ester, D.S. 0.95, were mixed thoroughly to prepare a 20 percent paste which was tested as in Example 1f. It retained its adhesiveness after coating for a shorter period than the paste of acetic acid ester in water. The increase of adhesiveness or tensile strength after bonding was about 1.5 times the corresponding values in Table I.

EXAMPLE 7

A 15 percent paste was prepared by dissolving equivalent amounts of pullulan acetic acid ester, D.S. 0.95, and pullulan propionic acid ester, D.S. 0.7, in a mixture of water and acetone (3:1). The paste was excellent in its drying rate and increase in adhesiveness, as well as in its adhesiveness.

EXAMPLE 8

A 10 percent paste prepared by dissolving pullulan acetic acid ester of D.S. 0.31 in warm water was spread on one end of a Kraft paper strip in an amount of 40 g per m². The paper strip was allowed to dry at 50°C overnight and thereafter at 70°C for 1 hour. After 1 day at a relative humidity of 60 percent, the portion of the paper strip (30 mm × 3 mm) on which the paste was spread was slightly moistened and was bonded under manual pressure to the bare end of another paper strip of the same quality. The bonded papers were tested and compared with control paper strips prepared with dextrin paste as described in Example 1f. The pullulan ester paste had a higher water absorption rate, developed its adhesiveness immediately after moistening, and was ready for use upon bonding. Thus, the paste is suitable for labeling containers on continuous labeling machines. In addition, the pullulan ester paste retained its adhesiveness at low humidity without delamination of the bonded materials. While the pullulan ester paste developed immediate adhesiveness upon absorption of moisture, the dissolution loss upon remoistening is small due to the relatively low water solubility of the gel formed by the paste.

EXAMPLE 9

Paste layers prepared from pullulan acetic acid and propionic acid esters, pullulan ethyl, carboxymethyl, hydroxopropyl ethers and dextrin were tested for support of fungus growth in a room kept at a relative humidity of 80 – 90 percent. On the dextrin paste, a considerable number of fungus colonies was noted, whereas paste prepared with the pullulan derivatives did not show such growth.

EXAMPLE 10

A 40 percent of pullulan acetic acid ester (D.S. 0.9) was prepared by dissolving the ester in a water-ethyleneglycol mixture (1:3) with stirring and heating. The paste had satisfactory adhesiveness when spread on paper or tape, and showed hardly any change in adhesiveness after an extended period.

What is claimed is:

1. An adhesive composition essentially consisting of a solution or dispersion of a derivative of pullulan having a molecular weight of 10,000 to 500,000 in an aqueous liquid,
   a. said derivative being an ester of said pullulan with a fatty acid having up to four carbon atoms or an alkyl, hydroxyalkyl, or carboxyalkyl ether of said pullulan, alkyl in said ether having up to four carbon atoms,
   b. said light being water or a mixture of water and acetone, and
   c. the amount of said derivative being between 5 and 4 percent of the weight of said liquid.

2. An adhesive composition as set forth in claim 1, further containing an amount of a polyhydric alcohol sufficient to act as a plasticizer for said derivative.

3. A composition as set forth in claim 2 wherein said polyhydric alcohol is glycerol, ethyleneglycol, propyleneglycol, trimethylolpropane, sorbitol or maltitol.

4. A composition as set forth in claim 2 wherein the amount of said polyhydric alcohol is smaller than the weight of said derivative.

5. A composition as set forth in claim 1, further containing a hydrophilic additive in an amount smaller than one third of the weight of said derivative, said additive being pullulan, amylose, starch, modified starch, gelatin, or polyvinyl alcohol.

6. A composition as set forth in claim 1, wherein said derivative is said ester, and the number of acyl groups of said fatty acid attached to said pullulan in said ester is sufficient to improve the water resistance of said derivative as compared to the water resistance of said pullulan.

7. A composition as set forth in claim 6, wherein the number of said acyl groups is between 0.7 and 2 acyl groups per glucose unit of said pullulan.

8. A composition as set forth in claim 1, wherein said derivative is said ether, and the number of alkyl, hydroxyalkyl, or carboxyalkyl groups attached to said pullulan in said ether is sufficient to improve the water resistance of said derivative as compared to the water resistance of said pullulan.

9. A composition as set forth in claim 8, wherein the number of said alkyl, hydroxyalkyl, or carboxyalkyl groups is at least 0.07 per glucose unit in said pullulan.

* * * * *

UNITED STATES PATENT OFFICE
CERTIFICATE OF CORRECTION

Patent No. 3,873,333　　　　　　　　　Dated March 25, 1975

Inventor(s) HIROMI HIJIYA ET AL

It is certified that error appears in the above-identified patent and that said Letters Patent are hereby corrected as shown below:

In the heading, after line [21], insert --

[30] Foreign Application Priority Data

January 23, 1973　　　Japan ............... 9186/73 --

Signed and sealed this 27th day of May 1975.

(SEAL)
Attest:

RUTH C. MASON
Attesting Officer

C. MARSHALL DANN
Commissioner of Patents
and Trademarks

UNITED STATES PATENT AND TRADEMARK OFFICE
CERTIFICATE OF CORRECTION

PATENT NO. : 3,873,333
DATED : March 25, 1975
INVENTOR(S) : HIROMI HIJIYA ET AL

It is certified that error appears in the above-identified patent and that said Letters Patent are hereby corrected as shown below:

Column 3, line 34, change "4" to -- 40 --.

Column 7, line 15, change "light" to -- liquid --;

line 18, change "4" to -- 40 --.

Signed and Sealed this

Twenty-sixth Day of October 1976

[SEAL]

*Attest:*

RUTH C. MASON
*Attesting Officer*

C. MARSHALL DANN
*Commissioner of Patents and Trademarks*